United States Patent
Nicolinco et al.

(10) Patent No.: US 11,530,645 B2
(45) Date of Patent: Dec. 20, 2022

(54) FLUID COOLER FOR A GAS TURBINE ENGINE

(71) Applicant: PRATT & WHITNEY CANADA CORP., Longueuil (CA)

(72) Inventors: Constantin Nicolinco, Toronto (CA); Gabriel Naccache, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/177,866

(22) Filed: Feb. 17, 2021

(65) Prior Publication Data

US 2022/0260015 A1 Aug. 18, 2022

(51) Int. Cl.
*F02C 7/12* (2006.01)
*F28F 1/10* (2006.01)
*F28F 13/08* (2006.01)

(52) U.S. Cl.
CPC .................. *F02C 7/12* (2013.01); *F28F 1/10* (2013.01); *F28F 13/08* (2013.01); *F05D 2220/323* (2013.01)

(58) Field of Classification Search
CPC ..... F02C 7/12; F28F 1/10; F28F 13/08; F05D 2220/323
See application file for complete search history.

(56) References Cited

U.S. PATENT DOCUMENTS

| 3,392,777 | A | 7/1968 | Edgemond, Jr. et al. | |
|---|---|---|---|---|
| 4,451,960 | A | 6/1984 | Molitor | |
| 4,865,124 | A * | 9/1989 | Dempsey | F28D 7/024 165/DIG. 441 |
| 5,572,885 | A | 11/1996 | Erickson | |
| 2005/0133202 | A1 | 6/2005 | Jorgensen | |
| 2014/0144139 | A1* | 5/2014 | Alecu | F02C 7/14 29/890.03 |
| 2015/0136368 | A1* | 5/2015 | Tandon | F28D 7/024 165/163 |
| 2017/0002741 | A1* | 1/2017 | Alecu | B21K 25/00 |
| 2018/0283795 | A1* | 10/2018 | Cerny | F28D 1/0472 |
| 2019/0137185 | A1 | 5/2019 | Steinbauer | |
| 2020/0088102 | A1* | 3/2020 | Roberge | F02C 3/22 |
| 2020/0284517 | A1* | 9/2020 | Becene | F28D 1/0472 |

FOREIGN PATENT DOCUMENTS

CA 2466564 5/2003

OTHER PUBLICATIONS

Extended European Search report dated Jul. 1, 2022, EP Application No. 22156426.3.

* cited by examiner

*Primary Examiner* — Shafiq Mian
(74) *Attorney, Agent, or Firm* — Norton Rose Fulbright Canada LLP

(57) ABSTRACT

A fluid cooler for a gas turbine engine comprises an outer tube having an outer tube inlet at a first end of the fluid cooler and an outer tube outlet at a second end of the fluid cooler. A primary axis of the fluid cooler is defined within the outer tube between the first and second ends of the fluid cooler. A plurality of inner tubes extend within the outer tube between the first second ends of the fluid cooler. The inner tubes have a common inner tube inlet and a common inner tube outlet. The inner tubes extend helically about the primary axis. A first group of the inner tubes are disposed at a first radius from the primary axis and a second group of the inner tubes are disposed at a second radius from the primary axis, the second radius different from the first radius.

19 Claims, 14 Drawing Sheets

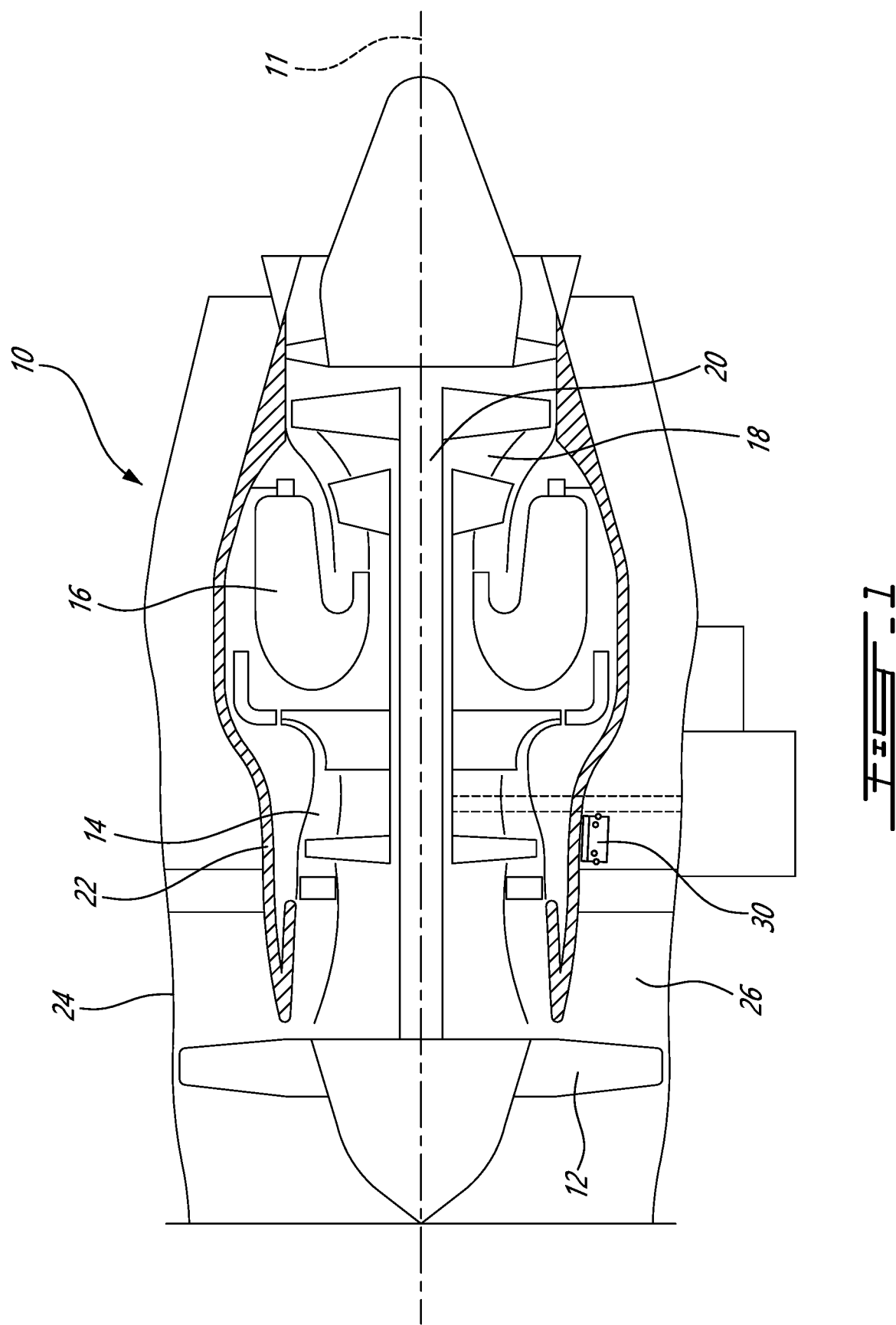

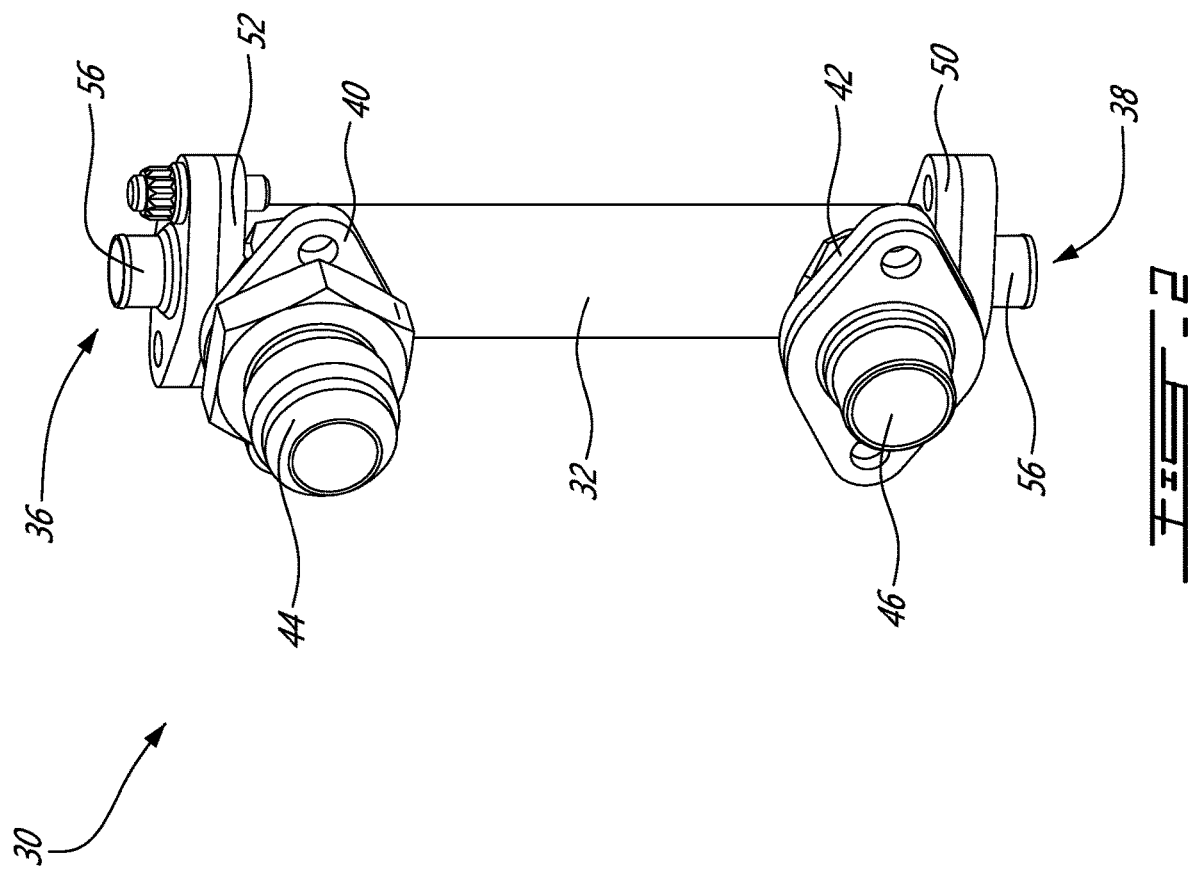

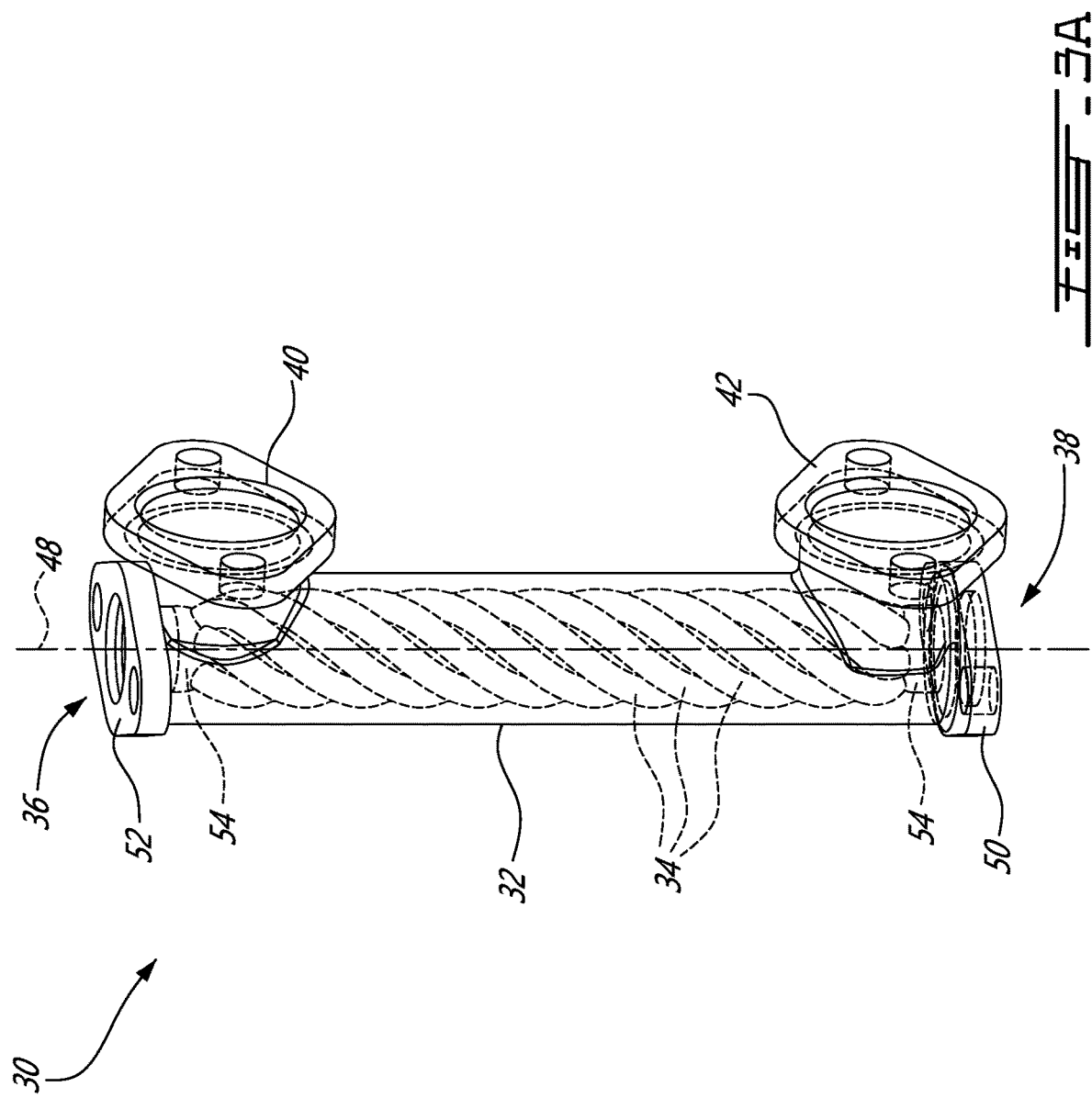

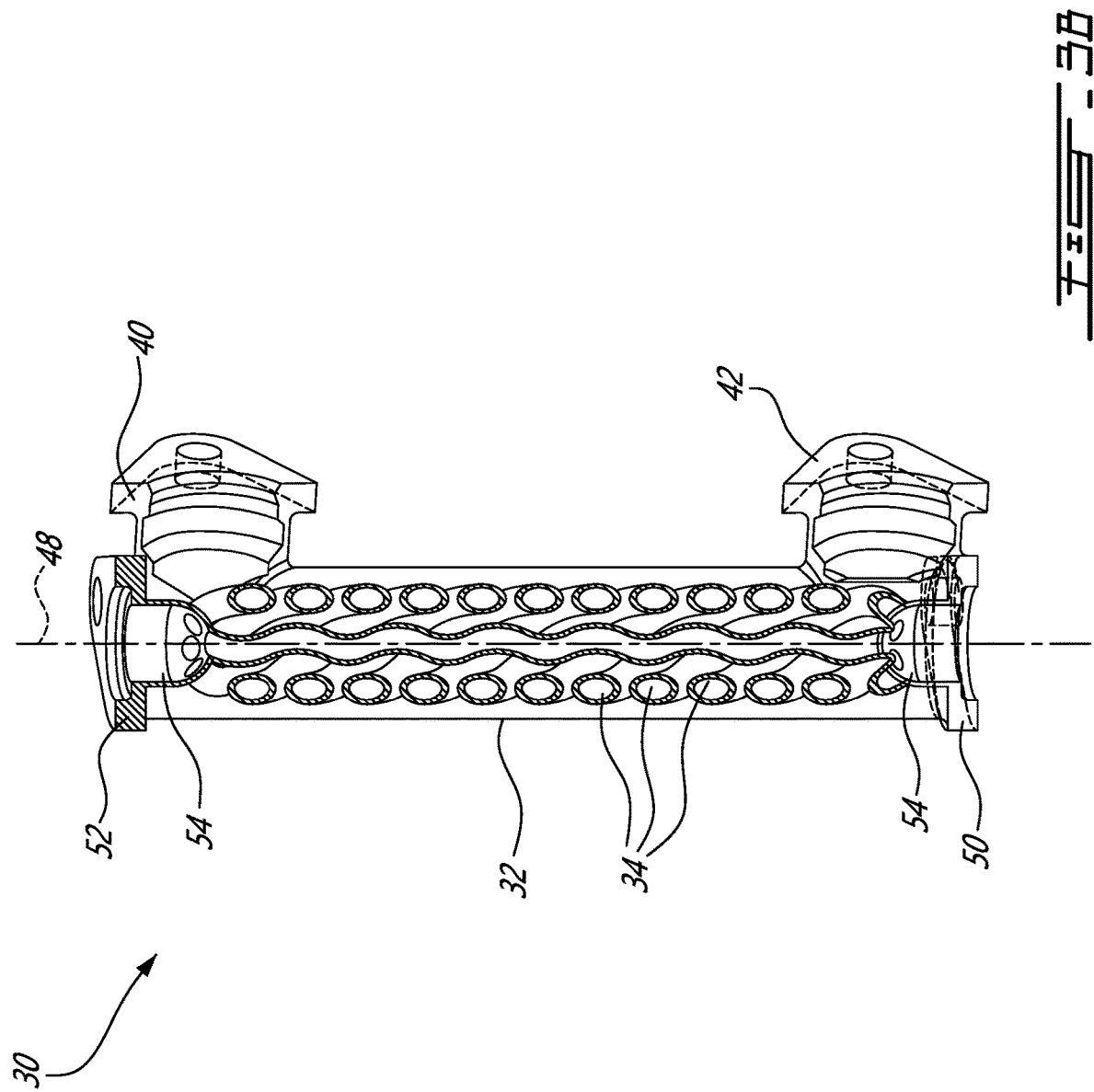

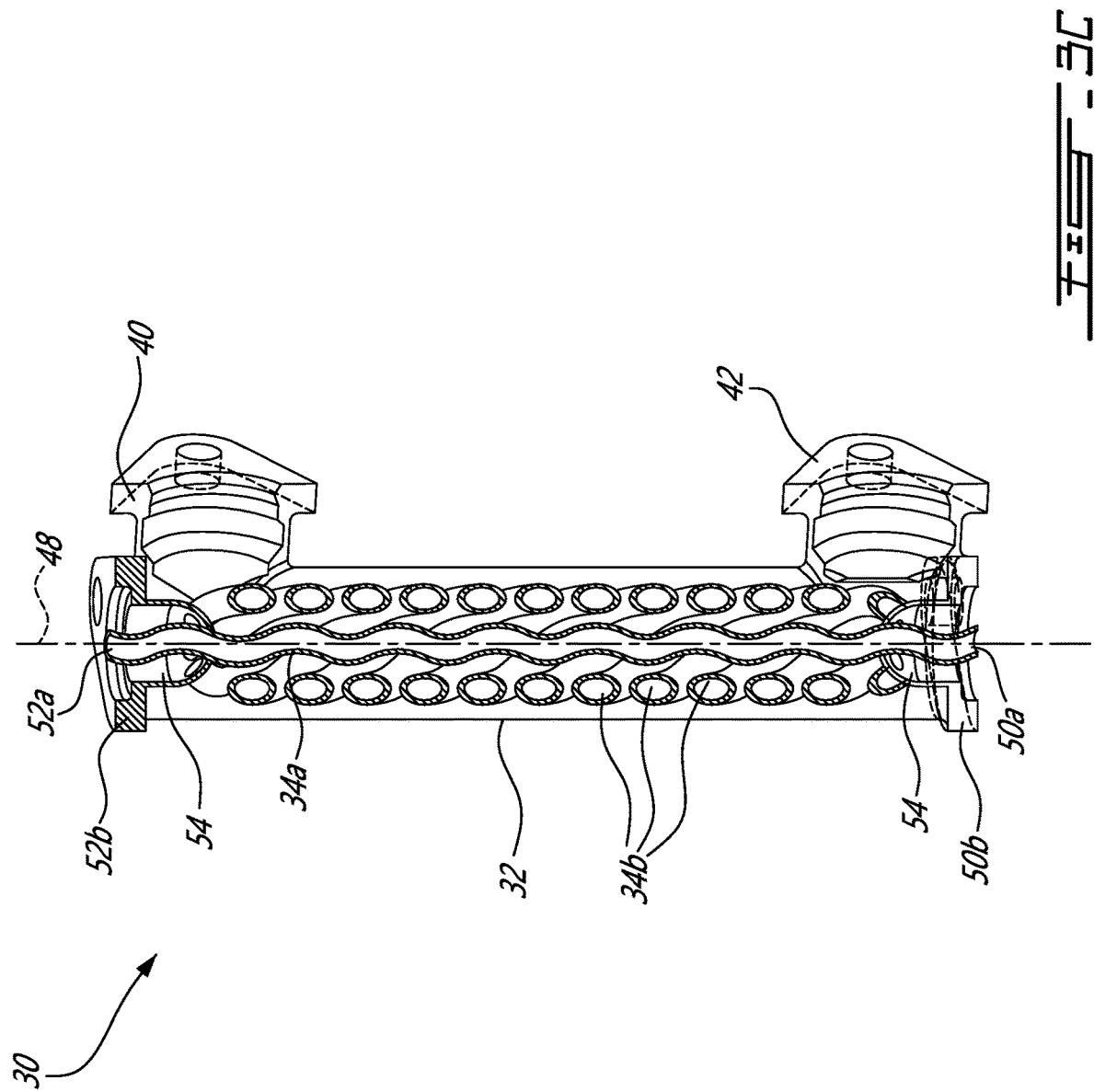

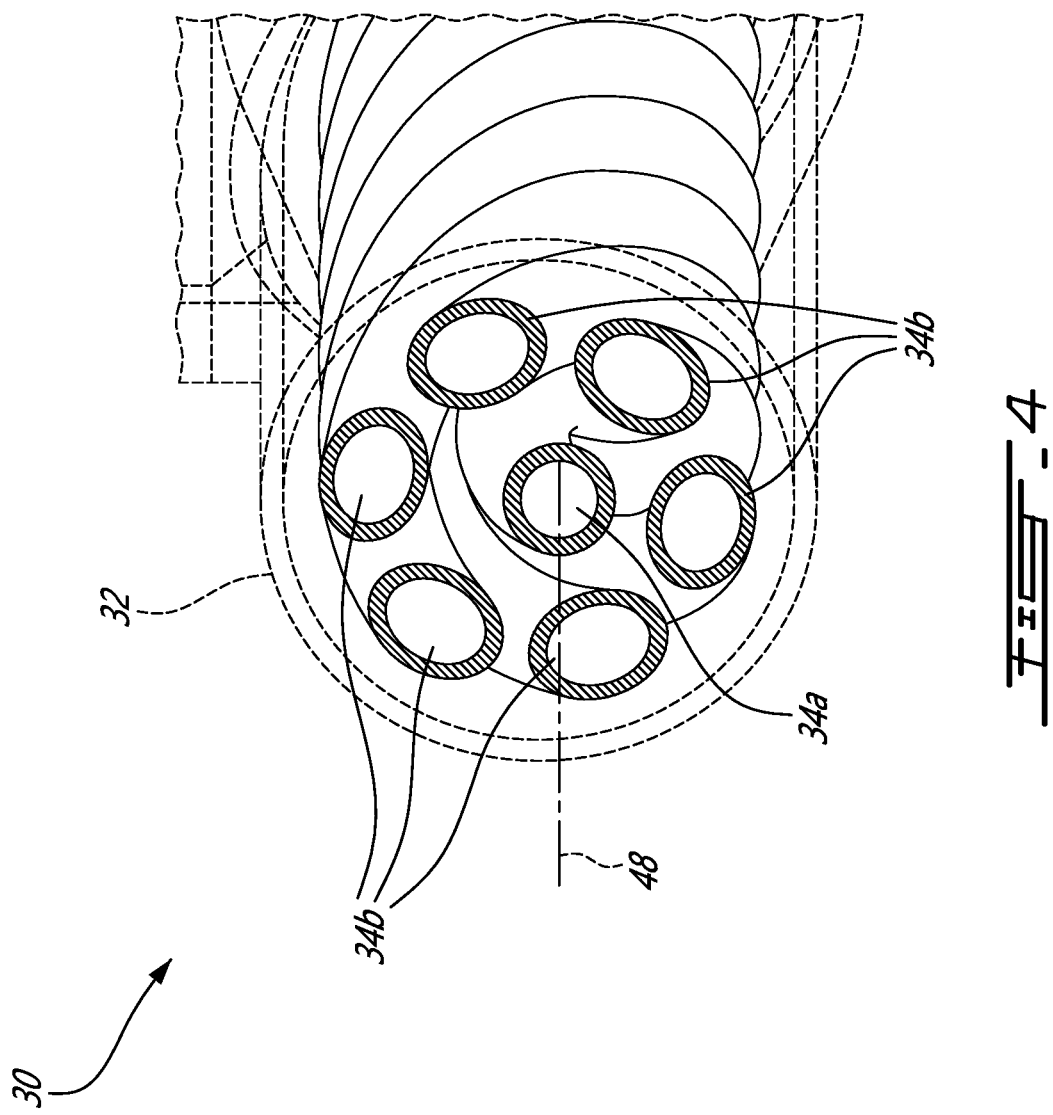

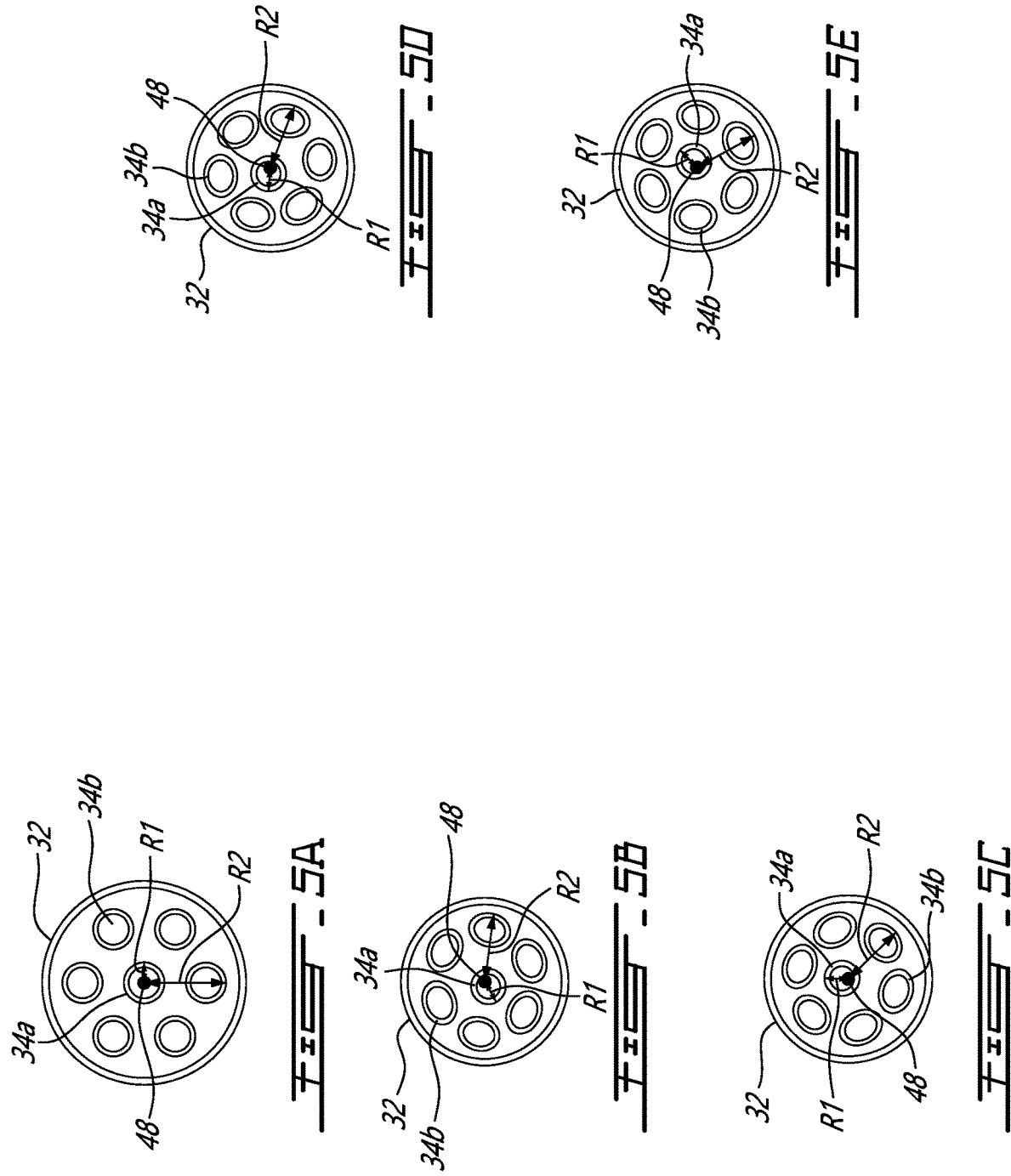

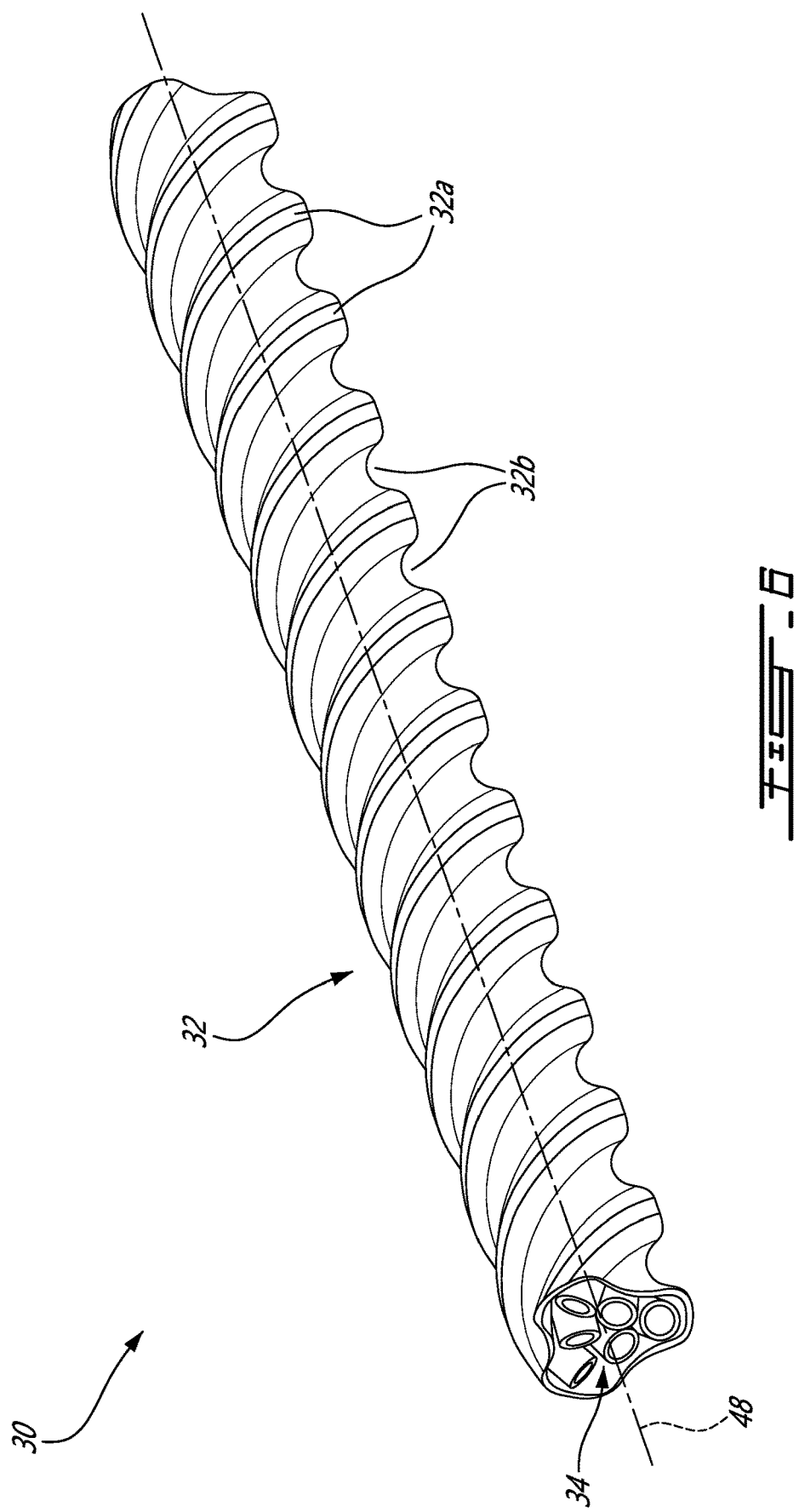

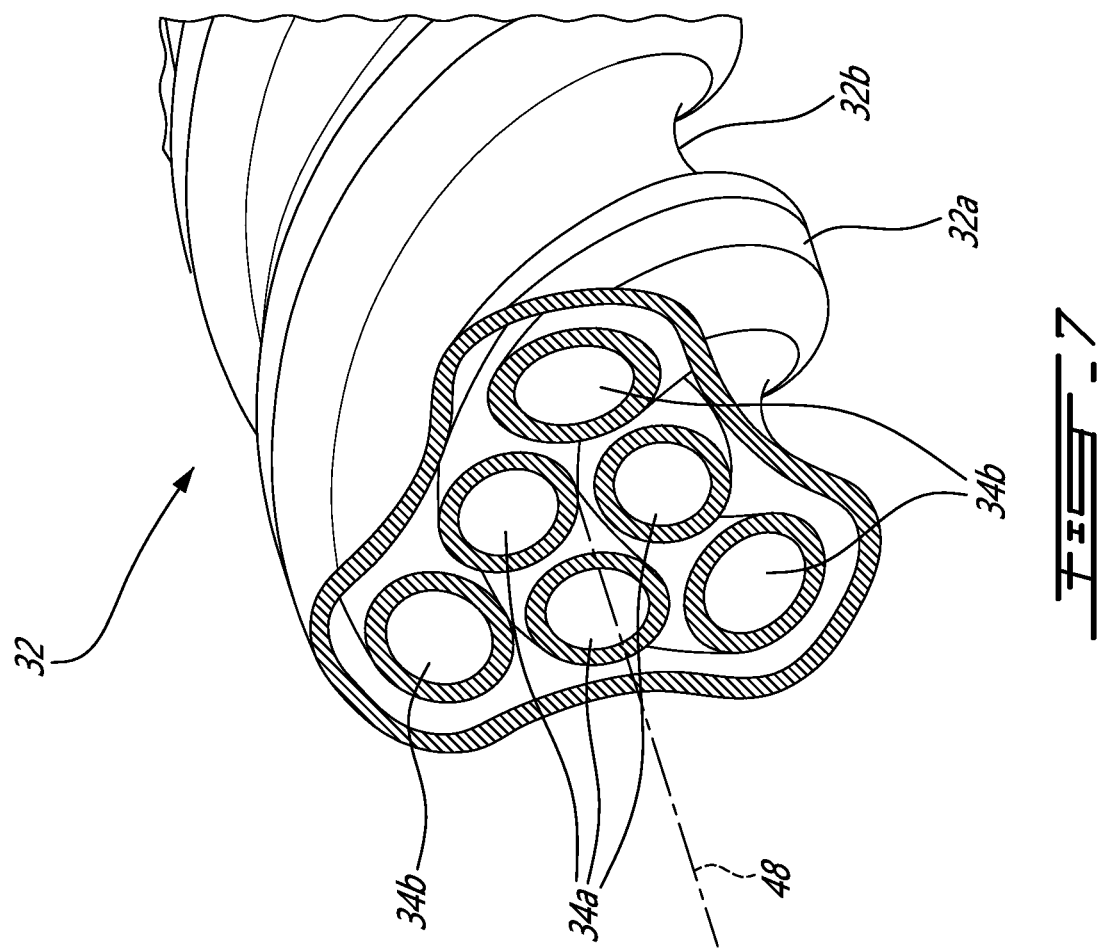

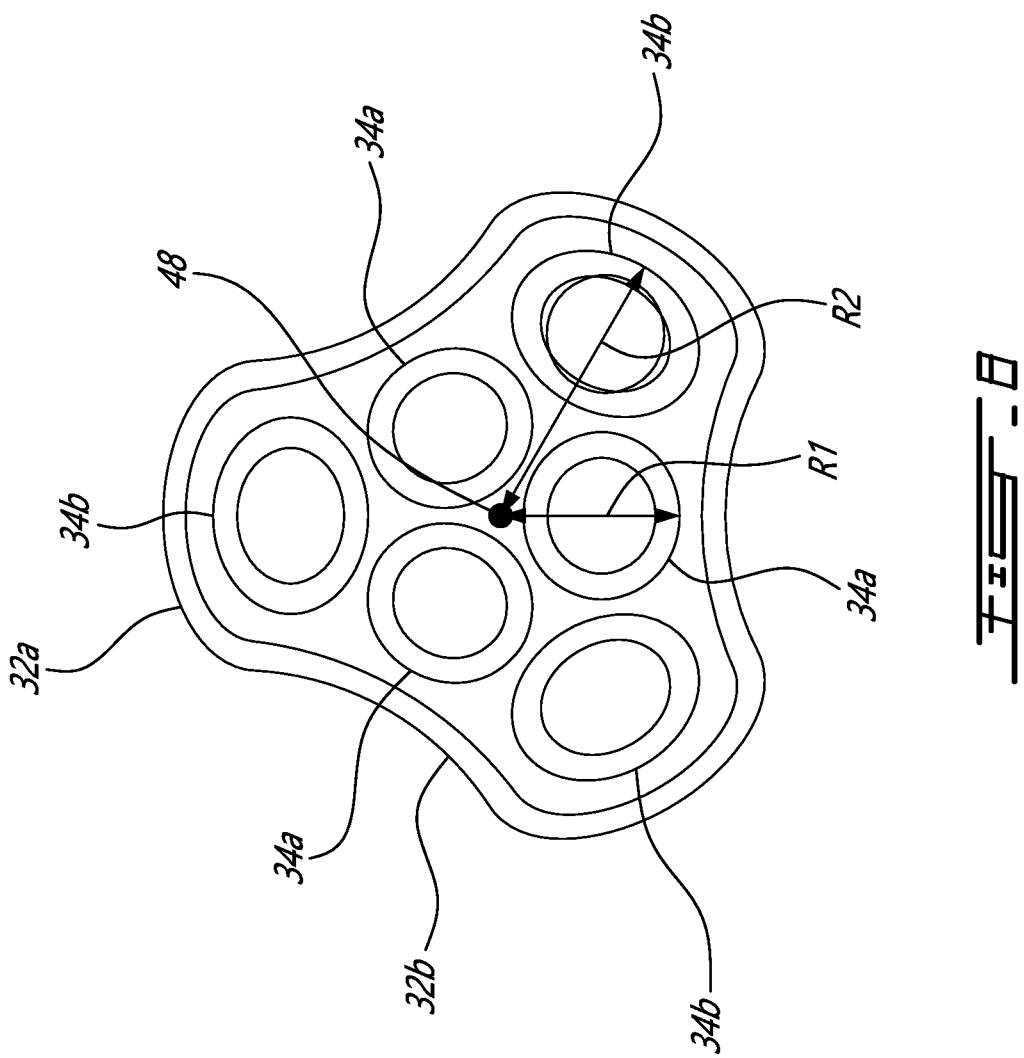

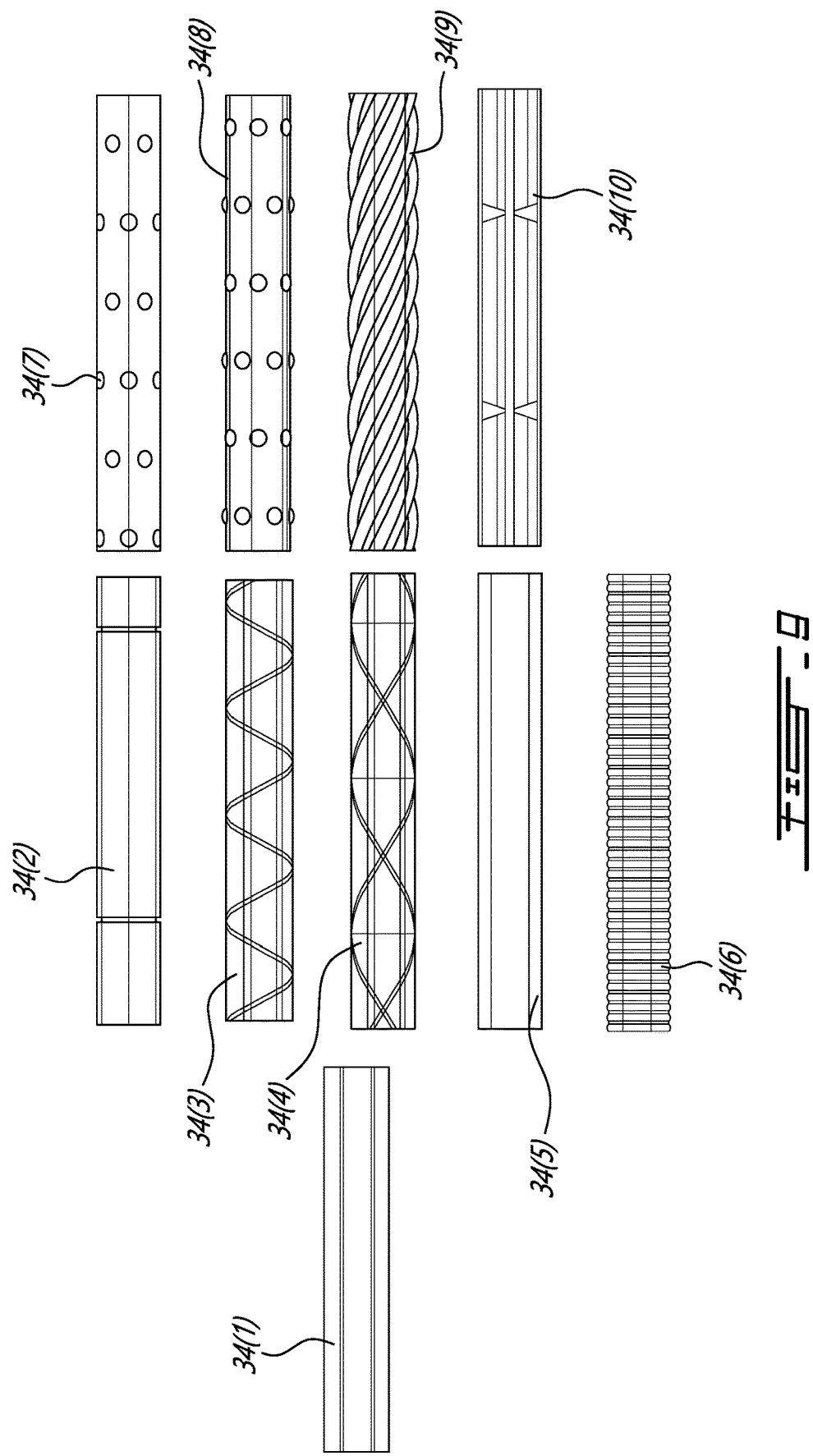

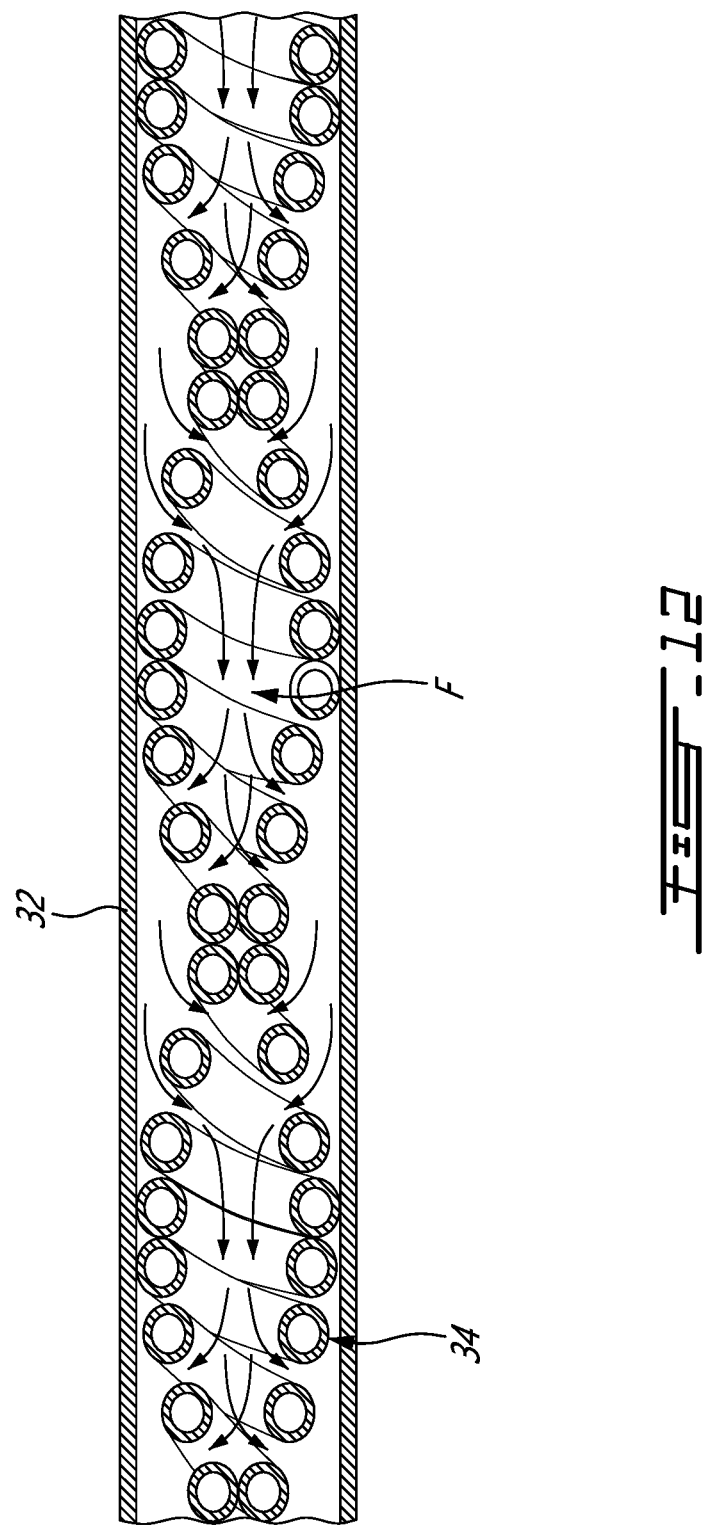

FLUID COOLER FOR A GAS TURBINE ENGINE

TECHNICAL FIELD

The disclosure relates generally to gas turbine engines and, more particularly, to fluid coolers for gas turbine engines.

BACKGROUND

Fluid coolers and heat exchangers are used in various locations in gas turbine engines to transfer heat between two or more fluids. Tubes containing the different fluids may be nested to promote the transfer of heat between the fluids. To increase the efficacy of a fluid cooler, the effective length of the tubes may be increased to increase the surface area on which the heat transfer may occur. However, doing so may increase the size and weight of the fluid cooler, requiring more space within the gas turbine engine, and potentially increasing the weight of the fluid cooler, both of which are undesirable in airborne gas turbine engines. In addition, by increasing the weight, additional mounting hardware may be required to support the fluid cooler within the gas turbine engine.

SUMMARY

In one aspect, there is provided a fluid cooler for a gas turbine engine, comprising: an outer tube having an outer tube inlet at a first end of the fluid cooler and an outer tube outlet at a second end of the fluid cooler, a primary axis of the fluid cooler defined within the outer tube between the first end of the fluid cooler and the second end of the fluid cooler; and a plurality of inner tubes extending within the outer tube between the first end of the fluid cooler and the second end of the fluid cooler, the plurality of inner tubes having a common inner tube inlet and a common inner tube outlet, the plurality of inner tubes extending helically about the primary axis of the fluid cooler, a first group of the plurality of inner tubes disposed at a first radius from the primary axis of the fluid cooler and a second group of the plurality of inner tubes disposed at a second radius from the primary axis of the fluid cooler, the second radius different from the first radius.

In another aspect, there is provided a gas turbine engine comprising: a casing of the gas turbine engine; a compressor section within the casing; an air supply; an oil supply; and a fluid cooler mounted outside the casing, comprising; an outer tube having an outer tube inlet fluidly coupled to the oil supply at a first end of the fluid cooler and an outer tube outlet at a second end of the fluid cooler, a primary axis of the fluid cooler defined within the outer tube between the first end of the fluid cooler and the second end of the fluid cooler; and a plurality of inner tubes extending within the outer tube between the first end of the fluid cooler and the second end of the fluid cooler, the plurality of inner tubes having a common inner tube inlet fluidly coupled to the air supply and a common inner tube outlet fluidly coupled to the compressor section, the plurality of inner tubes extending helically about the primary axis of the fluid cooler, a first group of the plurality of inner tubes disposed at a first radius from the primary axis of the fluid cooler and a second group of the plurality of inner tubes disposed at a second radius from the primary axis of the fluid cooler.

In a further aspect, there is provided a method for operating a fluid cooler in a gas turbine engine, comprising: flowing a first fluid through an outer tube of the fluid cooler between a first end of the fluid cooler and a second end of the fluid cooler; and flowing a second fluid at a different temperature than the first fluid through a plurality of inner tubes extending within the outer tube between the first end of the fluid cooler and the second end of the fluid cooler, the plurality of inner tubes extending helically about a primary axis of the fluid cooler defined within the outer tube between the first end of the fluid cooler and the second end of the fluid cooler, a first group of the plurality of inner tubes disposed at a first radius from the primary axis of the fluid cooler and a second group of the plurality of inner tubes disposed at a second radius from the primary axis of the fluid cooler.

BRIEF DESCRIPTION OF THE DRAWINGS

Reference is now made to the accompanying figures in which:

FIG. 1 is a schematic cross sectional view of a gas turbine engine;

FIG. 2 is a perspective view of a fluid cooler for a gas turbine engine;

FIG. 3A is a partially-sectioned perspective view of the fluid cooler of FIG. 2;

FIG. 3B is partially-sectioned perspective cross-sectional view of the fluid cooler of FIG. 2;

FIG. 3C is a partially-sectioned perspective cross-sectional view of a fluid cooler for a gas turbine engine;

FIG. 4 is a semi-transparent top cross-sectional view of the fluid cooler of FIG. 2;

FIGS. 5A-5E are top cross-sectional views of the fluid cooler of FIG. 2 taken at different points along a height of the fluid cooler;

FIG. 6 is a perspective view of a portion of a fluid cooler for a gas turbine engine;

FIG. 7 is an enhanced perspective view of the fluid cooler of FIG. 6;

FIG. 8 is a top cross-sectional view of the fluid cooler of FIG. 6;

FIG. 9 shows side views of various examples of inner tubes for the fluid coolers of FIGS. 2 and 6;

FIG. 12 is a side cross-sectional view of the fluid cooler of FIG. 2 with the pitch and the taper angle of the inner tubes varied non-linearly.

DETAILED DESCRIPTION

Figure 10:
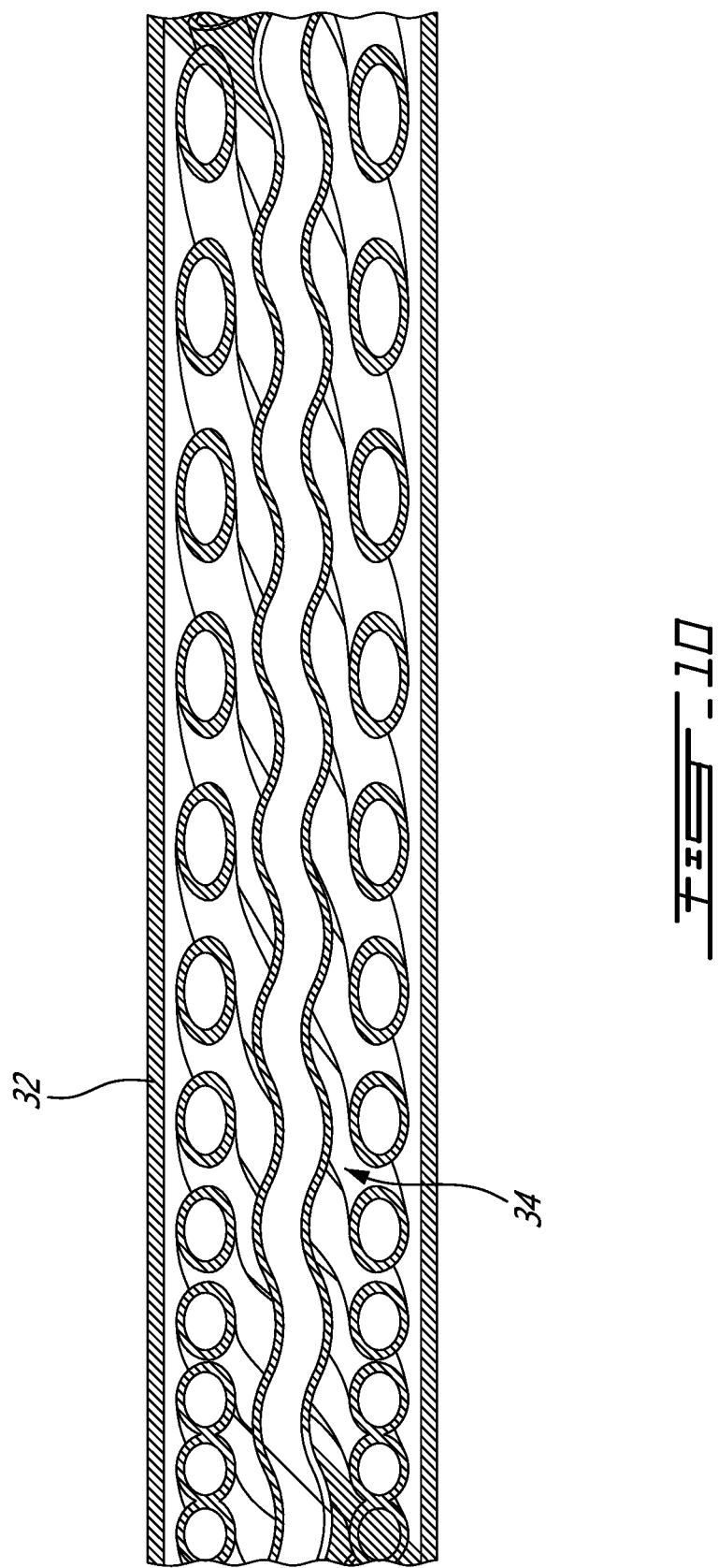
FIG. 10 is a side cross-sectional view of the fluid cooler of FIG. 2 with the pitch of the inner tubes varied linearly.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A shaft 20 extending along a central engine axis 11 interconnects the fan 12, the compressor section 14 and the turbine section 18. A core casing 22 surrounds the compressor section 14, combustor 16 and turbine section 18 to define a main fuel path. A nacelle 24 surrounds the fan 12 and core casing 22 to define an outer bypass duct 26 between the nacelle 24 and core casing 22. While FIG. 1 shows gas turbine engine 10 to be a turbofan gas turbine engine, it is understood that the present disclosure is applicable to other types of gas turbine engines as well, such as turboprops and turboshafts.

A fluid cooler 30, which is a heat exchanger, is illustratively mounted outside the core casing 22 and adjacent the compressor section 14. In the embodiment shown, where the gas turbine engine 10 is a turbofan gas turbine engine, the fluid cooler 30 may be mounted in the bypass duct 26 between the nacelle 24 and the core casing 24. Other locations for the fluid cooler 30 in other types of gas turbine engines may be contemplated as well. For example, in a turboprop or turboshaft engine, the fluid cooler 30 may be mounted to the external casing of the engine. In a particular embodiment, the fluid cooler 30 is operable to deliver a flow of cooling air to the compressor section 14 after the air has undergone a heat exchange process with a flow of engine oil, as will be discussed in further detail below. In other cases, the fluid cooler 30 may be utilized elsewhere in the engine to conduct heat exchange processes between two fluids.

Referring to FIGS. 2-3B, a fluid cooler 30 for a gas turbine engine includes an outer tube 32 through which a first fluid flows, and a plurality of inner tubes 34 (see FIGS. 3A-3B) that pass through the outer tube 32 and through which a second fluid flows. The first and second fluids may be different fluids, for instance oil and air. In other cases, the first and second fluids may be the same type of fluid but at different temperatures. The inner tubes 34 follow a helical or spiral-like pattern through the outer tube 32, as will be discussed in further detail below.

In the present embodiment, the first fluid flowing through the outer tube 32 is engine oil for the gas turbine engine 10 and the second fluid flowing through the plurality of inner tubes 34 is air, such as but not necessarily pressurized air bled off at a location upstream or downstream from a compressor of the compressor section 14 of the gas turbine engine 10. Other fluid types may however be contemplated as well. In one particular embodiment, the fluid cooler 30 is operable to promote heat transfer from the second fluid, i.e. air, flowing through the plurality of inner tubes 34 to the first fluid, i.e. oil, flowing through the outer tube 32, such that the air is cooled after having passed through the fluid cooler 30. In other cases, the fluid cooler 30 is operable to promote heat transfer from warm engine oil to a cooling flow of air. In other cases, the direction of heat transfer may be reversed, i.e. the fluid flowing through the outer tube 32 may transfer heat to the fluid flowing through the plurality of inner tubes 34. Regardless, it will be appreciated the heat will transfer from the hotter of the two fluids to the cooler of the two fluids, regardless of which fluid is directed through the inner tubes 34 and which is directed through the outer tube 32. The relative direction of each flow may be in the same direction, or the two fluid flows may flow in opposite directions through the fluid cooler 30. Fluids flowing in opposite directions through the fluid cooler 30, referred to as a 'counter-flow' configuration, may increase the fluid cooler's 30 overall heat transfer efficiency relative to a 'parallel flow' configuration where the different fluids travel in a same direction through the fluid cooler 30. The fluid cooler 30 of the depicted embodiment as depicted is a "single-pass" heat exchanger, in that the fluids in the outer tube 32 and the inner tubes 34 pass each other once. In alternate embodiments, however, multiple passes are possible, wherein one or both of the fluids travels back and forth two or more times within the fluid cooler before exiting.

In the embodiment shown, the outer tube 32 is a cylindrical outer tube with a circular cross-section extending from a first end 36 of the fluid cooler 30 to a second end 38 of the fluid cooler 30. Other cross-sectional shapes, for instance rectangular or oval-shaped, for the outer tube 32 may be contemplated as well. The fluid cooler 30 includes an outer tube inlet 40 positioned towards the first end 36 of the fluid cooler 30 and an outer tube outlet 42 positioned towards the second end 38 of the fluid cooler 30. Alternatively, the outer tube inlet 40 may be positioned towards the second end 38 of the fluid cooler 30 while the outer tube outlet 42 may be positioned towards the first end 36 of the fluid cooler 30. As such, the fluid passing through the outer tube 32, for instance oil for cooling the air flowing through the plurality of inner tubes 34, may be delivered to the fluid cooler 30 from either the first end 36 or the second end 38.

In the depicted embodiment, the outer tube inlet 40 and the outer tube outlet 42 are positioned along an outer surface of the outer tube 32. In addition, in the embodiment shown, the outer tube inlet 40 and the outer tube outlet 42 are oriented in a same direction, for example both defining inlet and outlet axis that intersect the primary axis of the fluid cool. This configuration may, for instance, ease of installation and removal. Other positions and directions may be contemplated as well. In the embodiment shown, both the outer tube inlet 40 and outer tube outlet 42 include two-bolt flange connections, although other arrangements may be contemplated as well. Various end fittings for fluidly connecting to the outer tube inlet 40 and the outer tube outlet 42 may be contemplated. For instance, FIG. 2 shows a B-nut with a nipple 44 mounted to the outer tube inlet 40 and a spigot fitting with an O-ring 46 mounted to the outer tube outlet 42. Various combinations of these end fittings, along with other types of end fittings, such as a 37 degree cone and nipple (not shown), may be contemplated as well. A primary axis 48 of the fluid cooler 30 is defined within the outer tube 32 between the first end 36 and the second end 38. In the shown embodiment, although not necessarily the case in all embodiments, the primary axis 48 is a longitudinal axis for the outer tube 32. Although this longitudinal axis may be centrally located, as shown, it may also be off-center. In still other cases, the primary axis 48 may be non-linear, for example it may be curved, S-shaped, etc. As will be discussed in further detail below, the primary axis 48 serves as the axis of rotation for the helical or spiraling plurality of inner tubes 34.

In the depicted embodiment, the outer tube inlet 40 and the outer tube outlet 42 extend perpendicularly from the outer tube 32 relative to the primary axis 48. Alternatively, the outer tube inlet 40 and outer tube outlet 42 may extend at different angles from the outer tube 32, for instance to form acute angles with the outer tube 32. Such acute angles may minimize the pressure losses in the fluid travelling through the outer tube 32. In the depicted embodiment where the cross-sectional shape of the outer tube 32 is circular, the outer tube inlet 40 and the outer tube outlet 42 are aligned along a length of the outer tube 32 parallel to the primary axis 48. In other cases, the outer tube inlet 40 and the outer tube outlet 42 may be offset relative to the length of the outer tube 32, i.e. the outer tube inlet 40 and outer tube outlet 42 are at different radial positions relative to the circular cross-section of the outer tube 32. Such offset positioning may, for instance, induce an additional swirl in the fluid traveling through the outer tube 32. Other positions and angles for the outer tube inlet 40 and outer tube outlet 42 may be contemplated as well, for instance based on the positioning of the inlet and outlet tubes of the various fluids in a given gas turbine engine 10.

As shown in FIGS. 3A-3B, the plurality of inner tubes 34 extend through the outer tube 32 between the first end 36 and the second end 38 of the fluid cooler 30. The plurality of inner tubes 34 have a common inner tube inlet 50, illustratively at the second end 38 of the fluid cooler 30, and a common inner tube outlet 52, illustratively at the first end 36 of the fluid cooler 30. As such, in the embodiment shown, the fluid flowing through the plurality of inner tubes 34, for instance air to be cooled by the oil flowing through the outer tube 32, flows from the second end 38 to the first end 36. The reverse arrangement may be contemplated as well. In the embodiment shown, the plurality of inner tubes 34 meet at either ends thereof at a respective inner tube plenum 54 before a respective inner tube inlet 50 or inner tube outlet 52. Additionally, in a particular embodiment, the inner tubes 34 are radially inwardly spaced from an inner surface of the outer tube 32. In other cases, the fluid cooler 30 may include multiple inner tube inlets and multiple inner tube outlets to allow for different fluids in need of cooling to pass through different inner tubes 34 simultaneously, as will be discussed in further detail below.

Referring to FIGS. 3A-3B and 4-5E, the plurality of inner tubes 34 extend or wrap helically about the primary axis 48, creating a spiral or helix-like shape through the inside of the outer tube 32. As such, the effective length of the plurality of inner tubes 34 may be increased relative to comparable inner tubes passing straight through the outer tube 32. Thus, the effective length of the plurality of inner tubes 34 may be increased without increasing the overall length of the fluid cooler 30. This increase in effective length may increase the overall rate of heat transfer between the fluid traveling through the plurality of inner tubes 34 and the fluid travelling through the outer tube 32. In addition, the helical nature of the plurality of inner tubes 34 may induce mixing or swirling of the fluid within the plurality of inner tubes 34. The fluid flowing within the outer tube 32 also may endure increased mixing due to its interaction with the spiraling inner tubes 34. Such factors may further contribute to the effectiveness of the overall cooling process.

The plurality of inner tubes 34 may be positioned at different radii from the primary axis 48, leading to a variety of possible rotational patterns. Such radii may be taken from the outer edge of a given inner tube 34 to the primary axis 48. The plurality of inner tubes 34 may be grouped into different groups of inner tubes 34, each group being at a different radius from the primary axis 48. The size and/or shape of the inner tubes 34 may vary between groups, as well as within a given group. In the case shown in FIGS. 5A-5E, a first group includes a single inner tube 34a disposed at a first radius R1 from the primary axis, while a second group includes six inner tubes 34b disposed at a second radius R2 from the primary axis 48. As such, the inner tube 34a is disposed at a distance R1 from the primary axis 48, while the inner tubes 34b are disposed at a distance R2 from the primary axis 48. Other numbers of groups, for instance three or more groups at different radii from the primary axis 48, as well as number of inner tubes 34 in each group, may be contemplated as well. For instance, the type of fluid, their mass flow rate, their target temperatures, etc. may factor into the number of inner tubes 34 and their respective rotation rates.

In another embodiment, as discussed above, the fluid cooler 30 may include multiple inner tube inlets and multiple inner tube outlets to allow for multiple fluids to be cooled at once. For instance, referring to FIG. 3C, a given fluid cooler 30 may include two inner tube inlets 50a, 50b and two inner tube outlets 52a, 52b. The first inner tube inlet 50a and the first inner tube outlet 52a may be joined by a first group of inner tubes 34a, illustratively a single inner tube 34a, while the second inner tube inlet 50b and the second inner tube outlet 52b may be joined by a second group of inner tubes 34b via the inner tube plenums 54. As such, a first fluid to be cooled may pass through the first inner tube inlet 50a, the first group of inner tubes 34a and the first inner tube outlet 52a, while a second fluid to be cooled may pass through the second inner tube inlet 50b, an inner tube plenum 54, the second group of inner tubes 34b, another inner tube plenum 54 and the second inner tube outlet 52b. Both of these fluids would thus be simultaneously cooled by the fluid traveling through the outer tube 32. Other modes of use may be contemplated as well, such as flowing the two fluids to be cooled sequentially through their respective inner tubes. Other arrangements and numbers of inner tube inlets and inner tube outlets may be contemplated as well.

FIGS. 5A-5E show cross-sectional views of the inner tubes 34 within the outer tube 32 taken at different points along a length of the outer tube 32, illustrating the spiraling nature of the inner tubes' path. The pitch of the inner tubes' 34 may vary, for instance to increase or decrease the number of spirals and therefore the effective length of the inner tubes 34. The rotation rate of the inner tubes 34 about the primary axis 48 may also vary along the length of the fluid cooler 30. For instance, in an embodiment a fluid cooler 30 may include more densely packed inner tubes 34 towards the first and second ends 36, 38 with more spacing between the inner tubes 34 towards the middle of the fluid cooler 30. As such, the rotational pattern of the inner tubes 34 about the primary axis 48 may be uniform or non-uniform, as will be discussed in further detail below. Other geometric considerations may be contemplated, as will be discussed in further detail below.

Various end fittings for fluidly connecting to the inner tube inlet 50 and inner tube outlet 52 may be contemplated. For instance, FIG. 2 shows flat two bolt flanges with C-seals 56 at both the inner tube inlet 50 and inner tube outlet 52. Other end fittings for the inner tube inlet 50 and outlet 52 may be contemplated as well, for instance the B-nut and nipple-type fitting 44 as mounted to the outer tube inlet 40 as per FIG. 2. Various combinations of these end fittings, along with other types of end fittings such as a 37 degree cone and nipple (not shown), may be contemplated as well.

Referring to FIGS. 3A-3B and 4, in an exemplary embodiment, warm engine air in need of cooling may enter the fluid cooler 30 through the inner tube inlet 50, pass through an inner tube plenum 54 before being diverted through the plurality of inner tubes 34. For instance, in one particular embodiment, this warm engine air is air bled from the exit of the compressor (sometimes referred to as "P2.8" air), or downstream of the exit of the compressor 14. Other sources for the warm engine air may be contemplated as well. Concurrently, relatively cool engine oil may enter the fluid cooler 30 via the outer tube inlet 40 and into the outer tube 32. As the two fluids flow through their respective tubes, heat is transferred from the air to the oil, effectively cooling the air. In the embodiment shown, the air and oil enter the fluid cooler 30 at opposite ends of the fluid cooler 30. In other cases, the air and oil, or other fluids selected for a heat transfer operation, may enter the fluid cooler 30 at the same end, for instance at the first end 36 or at the second end 38. The fluid cooler 30 may be reversible as well. In other cases, the outer tube 32 may transport the warm air to be cooled and the plurality of inner tubes 34 may transport the cooling engine oil. The fluid cooler 30 may therefore be used to transfer heat between at least two other fluids within the engine 10. The now-cooled air exiting the inner tube outlet 52 may be transported to, for instance, a location further upstream, such as the inlet of the compressor section 14, to cool the compressor section 14. The now-cooled air may accordingly be used to cool the bore and/or disc of a compressor rotor (such as an impeller or an axial compressor disc), or for cooling other parts of the engine 10.

A discussed above, the fluid cooler 30 and its associated mounting hardware may be mounted external to the engine's core casing 22, i.e. in the bypass duct 26 between the nacelle 24 and the core casing 22. Other locations for the fluid cooler 30 may be contemplated as well. In the case of engine air being cooled, the source and destination of the air may vary. For instance, the cooled air may be subsequently delivered to the compressor section 14. In the case of engine oil providing the cooling to the other fluid, the source and destination of the oil may vary as well. For instance, the oil may arrive from the engine's primary oil tank and, after the cooling process at the fluid cooler 30, be delivered to the engine's primary fuel-oil heat exchanger. Other sources and destinations for the various fluids may be contemplated as well.

Referring to FIGS. 6-8, another embodiment of a fluid cooler 30 according to the present disclosure is shown. FIG. 6 does not show the first or second ends of the fluid cooler, nor the inlets or outlets of the outer tube 32 and inner tubes 34. However, it is understood that the shown fluid cooler 30 includes an outer tube 32 extending between a first end and a second end of the fluid cooler with a plurality of inner tubes 34 passing through the outer tube 32. As in the above case, a first group of inner tubes 34a are positioned at a first radius R1 from the primary axis 48, in this case the central longitudinal axis of the outer tube 32. The size and/or shape of the inner tubes 34 may vary between groups, as well as within a given group. Three inner tubes 34a illustratively form this first group, although other numbers of first group inner tubes 34a may be contemplated as well. A second group of inner tubes 34b are positioned at a second radius R2 from the primary axis 48. Three inner tubes 34b illustratively form this second group, although other numbers of second group inner tubes 34b may be contemplated as well. Other numbers of groups may be contemplated as well at various radii from the primary axis 48.

The various inner tubes 34a, 34b are extended helically about the primary axis 48, as shown in FIGS. 6 and 7, forming a spiral or helical shape. The pitch of rotation may vary, as discussed above. In the embodiment shown, the outer tube 32 includes a cross-sectional shape consisting of peaks 32a and valleys 32b (see FIG. 8) and is extended helically or twisted around the inner tubes 34 to form an outer twisting or spiral shape that follows the contour of the inner tubes 34. By tightly wrapping the outer tube 32 around the inner tubes 34 such that the outer tube 32 conforms to the outer shape of the inner tubes 34, the overall efficacy of the heat transfer process may improve. For instance, the heat transfer coefficient on the outer surface of the inner tubes 34 may increase due to the lower cross-sectional area of the outer tube 32. In addition, the spiral-like shape of the outer tube 32 may contribute to further mixing of the fluid contained in the outer tube 32. The number of peaks 32a and valleys 32b may vary, for instance based on the length of the fluid cooler, the number of inner tubes 34 and their respective pitch.

Referring to FIG. 9, in various cases, the inner tubes 34 may have a variety of shapes and/or geometric features to promote heat exchange between the fluids. While a straight inner tube 34(1) may be used, i.e. with a circular cross-section, other shapes and features may be contemplated as well. For instance, the inner tubes 34 may include a square step inner tube 34(2), an inner tube with a spring-feature 34(3), a twisted-tape inner tube 34(4), a solid inner core tube 34(5), a corrugated inner tube 34(6), an inner tube with inward dimples 34(7), an inner tube with outward dimples 34(8), an inner tube with helical grooves 34(9), and/or an inner tube with a butterfly twisted-tape 34(10). Various combinations of the above inner tubes 34 may be contemplated. Inner tubes 34 with other shapes and/or features may be contemplated as well.

In various cases, the fluid cooler 30 as per the present disclosure may be lighter and smaller than existing fluid coolers, for instance due to the spiraling nature of the inner tubes 34, the peaks 32a and valleys 32b defined in the outer tube 32, and/or the various shapes and geometric features of the inner tubes 34. As such, the fluid cooler 30 may be supported by the various inlet and outlet rigid tubes (not shown) transporting the various fluids to or from the fluid cooler 30. Other supporting features or hardware for the fluid cooler 30 may be contemplated as well.

Figure 11:
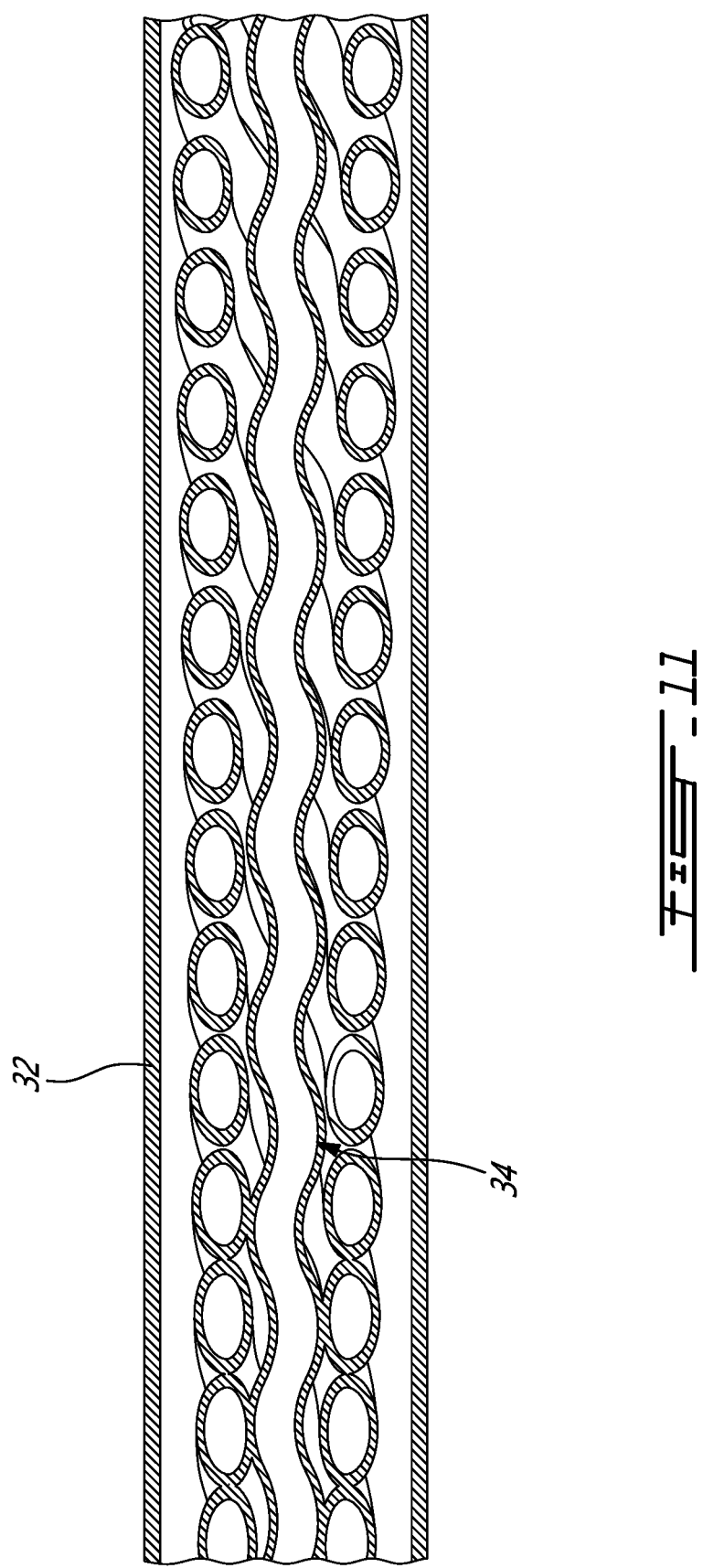
FIG. 11 is a side cross-sectional view of the fluid cooler of FIG. 2 with the taper angle of the inner tubes varied linearly.

Referring to FIGS. 10-12, in various cases, the pitch and taper angle of the inner tubes 34 may be varied linearly and/or non-linearly. While FIGS. 10-12 show the outer tube 32 being cylindrical, as per FIGS. 2-5E, it is understood that the pitch and taper angle of the inner tubes 34 may also be varied in the fluid cooler 30 shown in FIGS. 6-8. FIG. 10 shows the pitch of the inner tubes 34 varied linearly, FIG. 11 shows the taper angle of the inner tubes 34 varied linearly, and FIG. 12 shows both the pitch and the taper angle of the inner tubes 34 varied non-linearly. Other combinations may be contemplated as well.

By varying the pitch of the inner tubes 34, as shown in FIG. 10, the number of revolutions of the inner tubes 34 relative to the primary axis 48 may be altered based on the specific application. By varying the taper angle of the inner tubes 34, as shown in FIG. 11, the axial location of the inner tubes' 34 center axis with respect to their axis of rotation, i.e. the primary axis 48, may be altered. Various combinations of these alternations may be contemplated, for instance to improve fluid mixing and to increase the overall effectiveness of the fluid cooler 30. For instance, by adjusting both the pitch and taper angle of the inner tubes 34, as shown in FIG. 12, the flow of fluid F within the outer tube 32 may be forced to follow a sinusoidal pattern around the inner tubes 34. Other flow patterns due to the variations in pitch and taper angle of the inner tubes 34 may be contemplated as well.

As discussed above, the fluid cooler 30 as described herein may be referred to as a 'single pass' fluid cooler. In various cases, two or more such fluid coolers 30 may be connected in series for further cooling of one of the fluids, for instance the fluid passing through the inner tubes 34. Other arrangements may be contemplated as well. In various cases, the fluid cooler 30 may be manufactured via 3D printing, i.e. additive manufacturing, although other manufacturing techniques may be contemplated as well. In cases where the fluid cooler 30 is manufactured via additive manufacturing, additional mounting hardware may be integrated to the fluid cooler, for instance lugs (not shown) to mount the fluid cooler 30 directly to a flange or a supporting bracket within the engine 10.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fluid cooler for a gas turbine engine, comprising:
an outer tube having an outer tube inlet at a first end of the fluid cooler and an outer tube outlet at a second end of the fluid cooler, a primary axis of the fluid cooler defined within the outer tube between the first end of the fluid cooler and the second end of the fluid cooler, the outer tube inlet fluidly coupled to an oil supply within the gas turbine engine; and
a plurality of inner tubes extending within the outer tube between the first end of the fluid cooler and the second end of the fluid cooler, the plurality of inner tubes having a common inner tube inlet and a common inner tube outlet, the plurality of inner tubes extending helically about the primary axis of the fluid cooler, a first group of the plurality of inner tubes disposed at a first radius from the primary axis of the fluid cooler and a second group of the plurality of inner tubes disposed at a second radius from the primary axis of the fluid cooler, the second radius different from the first radius.

2. The fluid cooler as defined in claim 1, wherein the primary axis of the fluid cooler is a central longitudinal axis of the outer tube.

3. The fluid cooler as defined in claim 1, wherein the outer tube helically extends about the primary axis, conforming to an outer shape of the plurality of inner tubes.

4. The fluid cooler as defined in claim 1, wherein the common inner tube inlet is at the second end of the fluid cooler and the common inner tube outlet is at the first end of the fluid cooler.

5. The fluid cooler as defined in claim 1, wherein a pitch of one or more of the plurality of inner tubes varies along a length of the fluid cooler between the first end and the second end.

6. The fluid cooler as defined in claim 1, wherein a taper angle of one or more of the plurality of inner tubes varies along a length of the fluid cooler.

7. The fluid cooler as defined in claim 1, wherein the outer tube is a cylindrical outer tube.

8. The fluid cooler as defined in claim 1, wherein the plurality of inner tubes include circular cross-sections.

9. The fluid cooler as defined in claim 1, wherein the common inner tube inlet is fluidly coupled to an air supply within the gas turbine engine.

10. The fluid cooler as defined in claim 1, wherein the common inner tube outlet is fluidly coupled to a compressor section within the gas turbine engine.

11. The fluid cooler as defined in claim 1, wherein the outer tube inlet and the outer tube outlet define respective inlet and outlet axis which are oriented in a same direction on an outer surface of the outer tube, the inlet and outlet axis intersecting the primary axis of the fluid cooler.

12. A gas turbine engine comprising:
a casing of the gas turbine engine;
a compressor section within the casing;
an air supply;
an oil supply; and
a fluid cooler mounted outside the casing, comprising;
an outer tube having an outer tube inlet fluidly coupled to the oil supply at a first end of the fluid cooler and an outer tube outlet at a second end of the fluid cooler, a primary axis of the fluid cooler defined within the outer tube between the first end of the fluid cooler and the second end of the fluid cooler; and
a plurality of inner tubes extending within the outer tube between the first end of the fluid cooler and the second end of the fluid cooler, the plurality of inner tubes having a common inner tube inlet fluidly coupled to the air supply and a common inner tube outlet fluidly coupled to the compressor section, the plurality of inner tubes extending helically about the primary axis of the fluid cooler, a first group of the plurality of inner tubes disposed at a first radius from the primary axis of the fluid cooler and a second group of the plurality of inner tubes disposed at a second radius from the primary axis of the fluid cooler.

13. The gas turbine engine as defined in claim 12, wherein the primary axis of the fluid cooler is a central longitudinal axis of the outer tube.

14. The gas turbine engine as defined in claim 12, wherein the outer tube helically extends about the primary axis, conforming to an outer shape of the plurality of inner tubes.

15. The gas turbine engine as defined in claim 12, further comprising a nacelle surrounding the casing, wherein the fluid cooler is mounted between the nacelle and the casing.

16. The gas turbine engine as defined in claim 12, wherein a pitch of one or more of the plurality of inner tubes varies along a length of the fluid cooler.

17. The gas turbine engine as defined in claim 12, wherein a taper angle of one or more of the plurality of inner tubes varies along a length of the fluid cooler.

18. The gas turbine engine as defined in claim 12 wherein the plurality of inner tubes include circular cross-sections.

19. The gas turbine engine as defined in claim 12, further comprising a second fluid cooler fluidly coupled to the fluid cooler in series.

* * * * *